(12) United States Patent
DeLine

(10) Patent No.: US 7,194,259 B2
(45) Date of Patent: Mar. 20, 2007

(54) REMOTE CONTROL DEVICE HAVING WIRELESS PHONE INTERFACE

(75) Inventor: Jonathan DeLine, Morrisville, NC (US)

(73) Assignee: Sony Ericsson Mobile Communications AB (SE)

(*) Notice: Subject to any disclaimer, the term of this patent is extended or adjusted under 35 U.S.C. 154(b) by 189 days.

(21) Appl. No.: 10/605,058

(22) Filed: Sep. 5, 2003

(65) Prior Publication Data

US 2005/0064860 A1   Mar. 24, 2005

(51) Int. Cl.
*H04M 3/00* (2006.01)

(52) U.S. Cl. ............... 455/420; 455/419; 455/418; 455/550.1; 455/563; 455/567; 455/458; 455/557; 370/365; 370/343

(58) Field of Classification Search ............ 455/420, 455/550.1, 563, 418, 419, 567, 458, 557; 370/365, 343
See application file for complete search history.

(56) References Cited

U.S. PATENT DOCUMENTS

| | | | |
|---|---|---|---|
| 5,802,460 A * | 9/1998 | Parvulescu et al. ............ 455/92 |
| 5,973,475 A * | 10/1999 | Combaluzier ................ 320/107 |
| 6,223,029 B1 * | 4/2001 | Stenman et al. ............. 455/420 |
| 6,292,210 B1 | 9/2001 | Gerszberg et al. |
| 6,295,448 B1 * | 9/2001 | Hayes et al. ................. 455/420 |
| 6,339,706 B1 | 1/2002 | Tillgren et al. |
| 6,353,413 B1 * | 3/2002 | White et al. ................. 342/453 |
| 6,622,018 B1 * | 9/2003 | Erekson ....................... 455/420 |
| 6,741,684 B2 * | 5/2004 | Kaars ....................... 379/110.01 |
| 6,748,278 B1 * | 6/2004 | Maymudes ................... 700/17 |
| 6,760,415 B2 * | 7/2004 | Beecroft ................. 379/110.01 |
| 2002/0004414 A1 | 1/2002 | Rosay et al. |
| 2002/0068610 A1 * | 6/2002 | Anvekar et al. ............ 455/560 |
| 2005/0009567 A1 * | 1/2005 | Holmes ....................... 455/563 |
| 2003/0003907 A1 * | 1/2003 | Lai et al. ..................... 455/425 |
| 2003/0040334 A1 * | 2/2003 | Lee .............................. 455/557 |
| 2003/0041332 A1 * | 2/2003 | Allen et al. ................. 725/106 |
| 2004/0004603 A1 * | 1/2004 | Gerstner et al. ............ 345/169 |
| 2004/0266419 A1 * | 12/2004 | Arling et al. ............... 455/420 |

FOREIGN PATENT DOCUMENTS

JP    10 094070    7/1998
WO   WO/03/056790   7/2003

OTHER PUBLICATIONS

International Search Report, PCT/IB2004/001063, Sony Ericsson Mobile Communications AB, Jul. 19, 2004.

(Continued)

*Primary Examiner*—Joseph Feild
*Assistant Examiner*—Khai Nguyen
(74) *Attorney, Agent, or Firm*—Gregory A. Stephens; Moore & Van Allen PLLC

(57) ABSTRACT

A remote control device (RCD) typical of a television or home entertainment system is adapted to be communicable with a mobile phone. When a mobile phone receives a signal in a first wireless protocol from a digital cellular network (DCN), the signal is wirelessly forwarded to the RCD in a second wireless protocol for processing such as answering a voice call or displaying message data using the RCD. In addition, the RCD is wirelessly communicable with one or more peripheral devices such as a television and/or other components of a home entertainment system. The RCD can further forward the signal or a component of the signal received from the mobile phone to one of the peripheral devices for output. Thus, if a mobile phone is not handy when a signal is received, it can be passed to the RCD to be handled in a manner deemed appropriate by a user.

8 Claims, 4 Drawing Sheets

OTHER PUBLICATIONS

Written Opinion, PCT/IB2004/001063, Sony Ericsson Mobile Communications AB, Jul. 19, 2004.

Sony Ericsson Mobile Communications AB, *International Application Ser.* No. PCT/IB2004/001063, "International Preliminary Report on Patentability", Aug. 29, 2005.

* cited by examiner

REMOTE CONTROL DEVICE HAVING WIRELESS PHONE INTERFACE

BACKGROUND OF INVENTION

When operated away from home, a mobile phone is typically found within arm's reach of its user. At home, however, a mobile phone and user are often easily separated. A user sometimes loses track of a mobile phone's whereabouts as the user becomes occupied with other endeavors or distractions, such as watching television or listening to a stereo. Often, a mobile phone is placed in a stationary cradle for recharging while at home. Given the increased distance between a mobile phone and user, an incoming mobile phone call can inconvenience the user when at home. Specifically, a ringing mobile phone requires the user to track down the mobile phone's location, identify the caller, and then answer the call. This process typically forces the user to miss portions of the television program or music the user was enjoying prior to the incoming call. Further, after answering the incoming call, the user has to watch television or listen to music while simultaneously conducting a conversation via the mobile phone.

With today's advanced consumer electronic remote control devices used to manage home entertainment systems, it is desirable to develop a remote control device (RCD) that includes a wireless interface communicable with a mobile phone. An RCD with a wireless interface could greatly reduce the inconvenience a user faces when encountering a mobile phone that rings at home.

SUMMARY OF INVENTION

A remote control device (RCD) typical of a television or home entertainment system is adapted to be communicable with a mobile phone. When a mobile phone receives a signal in a first wireless protocol from a digital cellular network (DCN), the signal is wirelessly forwarded to the RCD in a second wireless protocol for processing such as answering a voice call or displaying message data using the RCD. In addition, the RCD is wirelessly communicable with one or more peripheral devices such as a television and/or other components of a home entertainment system. The RCD can further forward the signal or a component of the signal received from the mobile phone to one of the peripheral devices for output. Thus, if a mobile phone is not handy when a signal is received, it can be passed to the RCD to be handled in a manner deemed appropriate by a user.

The RCD seamlessly interfaces with the mobile phone. To interface with a mobile phone, the RCD includes a first wireless interface for controlling one or more peripheral devices and a second wireless interface for communicating with a mobile phone. Since the RCD can assume many of the tasks of a mobile phone, the RCD further includes a speaker for outputting audio signals received from the mobile phone, a microphone for receiving audio signals to be transmitted to the mobile phone, and a processor for processing wireless signals communicated between the RCD and the mobile phone. In operation, the RCD receives a signal from the mobile phone in response to the mobile phone receiving a wireless signal from a digital cellular network (DCN).

The mobile phone passes the signal received from the DCN to the RCD for processing. The processing depends on the type of signal that the mobile phone sends to the RCD, voice or data. The RCD can act as an extension phone for a voice call by connecting to an incoming call and carrying out a full duplex conversation. The RCD can also forward the audio portion of a signal received from a mobile phone to a peripheral device under control of the RCD such as a television.

The RCD can also process data signals received from the mobile phone. Data signals can include a text data signal, an audio data signal, a video data signal, or any combination thereof. This would include SMS, MMS, and e-mail messages. The RCD can also relay received data signals to one or more peripheral devices under control of the RCD for a more robust video and audio output of data originally intended just for the mobile phone.

DETAILED DESCRIPTION

For purposes of this description, the term "mobile phone" is used to refer to a mobile phone operating on a wireless network. The standards and/or protocols of the wireless network is immaterial to the operation of the present invention. The present invention is designed to be operable regardless of the wireless network protocol used by a mobile phone.

Figure 1:
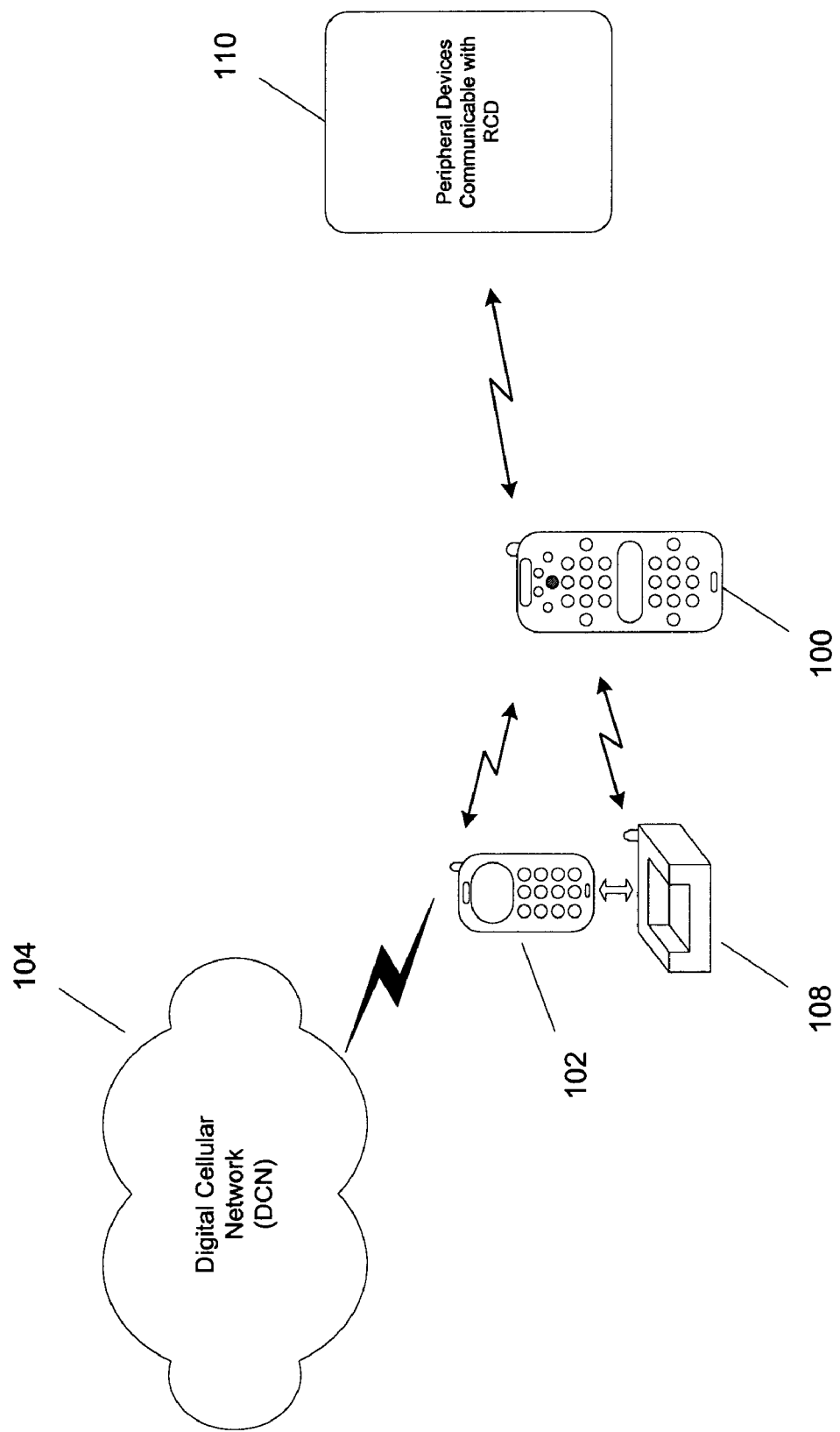
FIG. 1 is a block diagram illustrating certain components of the present invention and their environment.

FIG. 1 illustrates the environment and interaction among the functional elements of a network in which the present invention resides. A mobile phone 102 is capable of transmitting and receiving multiple types of digital signals over a Digital Cellular Network (DCN) 104. Typically, DCN 104 is a wireless telephony network that can be based on Code Division Multiple Access (CDMA), Time Division Multiple Access (TDMA), Global System for Mobile Communications (GSM), or other telephony protocols. A header embedded within incoming digital signals received by mobile phone 102 from DCN 104 indicates the type of digital signal received. The most common type of digital signal is a voice signal for purposes of a carrying on a full-duplex conversation. Data signals, however, are becoming more common to DCNs as mobile phones become more robust with respect to sending and receiving textual, audio, and image or video data.

A received digital voice signal is typically decoded by mobile phone 102 into an analog audio signal while a digital data signal is processed internally by appropriate hardware and software within mobile phone 102. A digital multimedia signal is handled by mobile phone 102 as containing separate digital voice and digital data components. Digital signals containing voice, data, or multimedia content are processed according to known wireless standards such as Short Messaging Service (SMS), Multimedia Messaging Service (MMS), or Adaptive Multi-Rate (AMR) for voice. Mobile phone 102 is also capable of creating and transmitting a multimedia message over DCN 104 using an integrated microphone and camera if so equipped. Multimedia messages can be created by the mobile phone 102 via direct user manipulation or remotely from RCD 100.

Mobile phone 102 is further capable of re-transmitting or relaying a received digital signal from DCN 104 to RCD 100 and vice-versa. Communication to and from RCD 100 is over a wireless protocol using a licensed or unlicensed frequency band having enough bandwidth to accommodate digital voice, data, or multimedia signals. For example, it can be based on the Bluetooth™, the 802.11 (a, b, g, h, or x) protocols, or other known protocol using the 2.4 GHz, 5.8 GHz, 900 MHz, or 800 MHz spectrum.

To facilitate interaction with RCD 100, mobile phone 102 uses a separate lower power RF unit from the primary RF unit used for interaction with DCN 104. If mobile phone 102 is not equipped with the capability to interact with RCD 100, then a base unit 108 can be used to interact with RCD 100. Mobile phone 102 can sit in base unit 108 in such a way as to allow a digital signal received by mobile phone 102 to be communicated over a serial communications port to base unit 108. Likewise, base unit 108 is equipped with a serial communications port to receive digital signals from mobile phone 102. Base unit 108 is also equipped with an RF unit so as to be able to interact with RCD 100. Further, base unit 108 can act as an intermediary between mobile phone 102 and RCD 100. Specifically, base unit 108 can transmit and receive digital signals between mobile phone 102 and RCD 100.

Base unit 108 has access to an independent power source. Access to a power source allows base unit 108 to transmit and receive signals over longer distances than the mobile phone 102 is capable of transmitting and receiving signals with its reduced power secondary RF unit. In fact, base unit 108 may be used even if mobile phone 102 is equipped to interact with RCD 100 in order to accommodate communication over a longer distance. The power source also allows base unit 108 to perform its primary duty of re-charging the battery in mobile phone 102.

As previously mentioned, RCD 100 is equipped with an RF unit for interacting with mobile phone 102 and/or base unit 108. Specifically, RCD 100 can transmit and receive digital signals to and from mobile phone 102 and can transmit digital signals to other peripheral electronic devices 110. Typically, those devices will be part of a home entertainment system such as a television, a stereo including associated speakers, or a personal computer (PC). RCD 100 also contains a digital signal processor (DSP)/microprocessor having multimedia codec capabilities. RCD 100 is further equipped with a microphone and speaker to enable a user to conduct a conversation through mobile phone 102 in a full-duplex manner. By including a microphone and speaker, RCD 100 can be used just like an extension telephone to carry out a conversation that was initiated by mobile phone 102.

RCD 100 further has the ability to access and control aspects of mobile phone 102. For example, remote control 100 can access mobile phone 102 to enable voice dialing or to create an SMS or MMS message. RCD 100 has the ability to relay, re-route, or re-transmit digital signals to other peripheral devices 110 that are under the control of RCD 100. These other electronic devices may also be controlled by RCD 100 using, for example, an infrared or RF link. RCD 100 can either route re-transmit a digital signal from mobile phone 102 or base unit 108 directly to other peripheral devices 110. A picture caller ID signal, received by mobile phone 102 from DCN 104, for instance, can be automatically forwarded by either mobile phone 102 or base unit 108 to RCD 100 and then on to a television for display. RCD 100 also contains an internal, rechargeable power supply to facilitate untethered operation.

If the peripheral device 110 is a television, for instance, the television can receive re-transmitted or relayed digital signals from RCD 100. For the convenience of the user, an incoming call can trigger a chain of events that ensures the user does not miss anything being watched on the television. Many televisions are now equipped, either internally or via a controllable accessory, with a digital video recorder that has the ability to pause live television and save video data to a hard drive. Thus, if a call is received on mobile phone 102 and mobile phone 102 is out of reach of the user, then the call information and the call itself can be forwarded to RCD 100. If the user decides to answer the call using RCD 100, then RCD 100 could cause the television to pause until the call is complete or the user overrides the pause function.

A television includes integrated speakers capable of broadcasting audio. Further, many televisions are capable of displaying both digital and analog video as well as displaying and/or broadcasting multimedia in commonly know wireless executable formats including, but not limited to, MMS, SMS, Caller ID, Picture Caller ID, and Joint Photographic Experts Group (JPEG). Similarly, audio may be broadcasted in a variety of formats including, but not limited to, Musical Instrument Digital Interface (MIDI) or MPEG Audio Layer 3 (MP3). Voice, data, audio, or MMS message executions can be displayed in a "picture in picture" window on a television. Thus, data originally intended for and received by mobile phone 102 can be routed or re-transmitted to a television via RCD 100 to enhance the look and sound of the data on a larger screen display.

A television may also be compatible with other peripheral devices in a home entertainment system including, but not limited to, high-power speakers, a digital video recorder (DVR), digital video disc (DVD) players, videocassette recorders (VCRs), and gaming systems. A television may also contain multimedia codec abilities. The codec provides the television with the capability to synchronize audio and video for displaying multimedia messages without frame lagging, echo, or delay while simultaneously carrying on a full-duplex conversation with its speaker output and audio input received from RCD 100 via mobile phone 102 or base unit 108.

High-power speakers can receive audio from a wired connection from a television or from a tuner, amplifier, or other similar audio device common in a home entertainment system. Alternatively, the speakers can be fitted with an RF unit to be compatible with RCD 100. If the speakers are wireless-capable, they can output audio from mobile phone 102, base unit 108, RCD 100, or a television. Audio generated at mobile phone 102 or base unit 108 can be routed directly to he speakers through a decision enacted at RCD 100.

Similarly, a DVR can be wired directly to a television or alternatively can contain an RF unit compatible with RCD 100. A DVR is capable of automatically recording signals displayed by a television when an incoming signal from DCN 104 is received by mobile phone 102. This capability allows the incoming communication to/from DCN 104 to override the normal video and audio capabilities of the television. The audio and video capabilities of the television can then be employed for communication interaction with DCN 104 while the DVR ensures that any audio or video displaced by this feature is not lost but is instead captured for later display.

Peripheral devices 110 can include, but are not limited to, personal video recorders, DVD players, VCRs, and gaming systems. Peripheral devices 110 can be fitted with an RF unit compatible with RCD 100. This compatibility allows peripheral devices 110 to recognize when mobile phone 102 receives an incoming signal from DCN 104. When an incoming signal is recognized by a peripheral device 110 such as a television, it can automatically pause operation so that the television can be used to interact with the incoming communication. Pausing operations may include, but are not limited to, pausing a recording operation, pausing a game, or pausing a movie display depending on the peripheral device in question.

Figure 2:
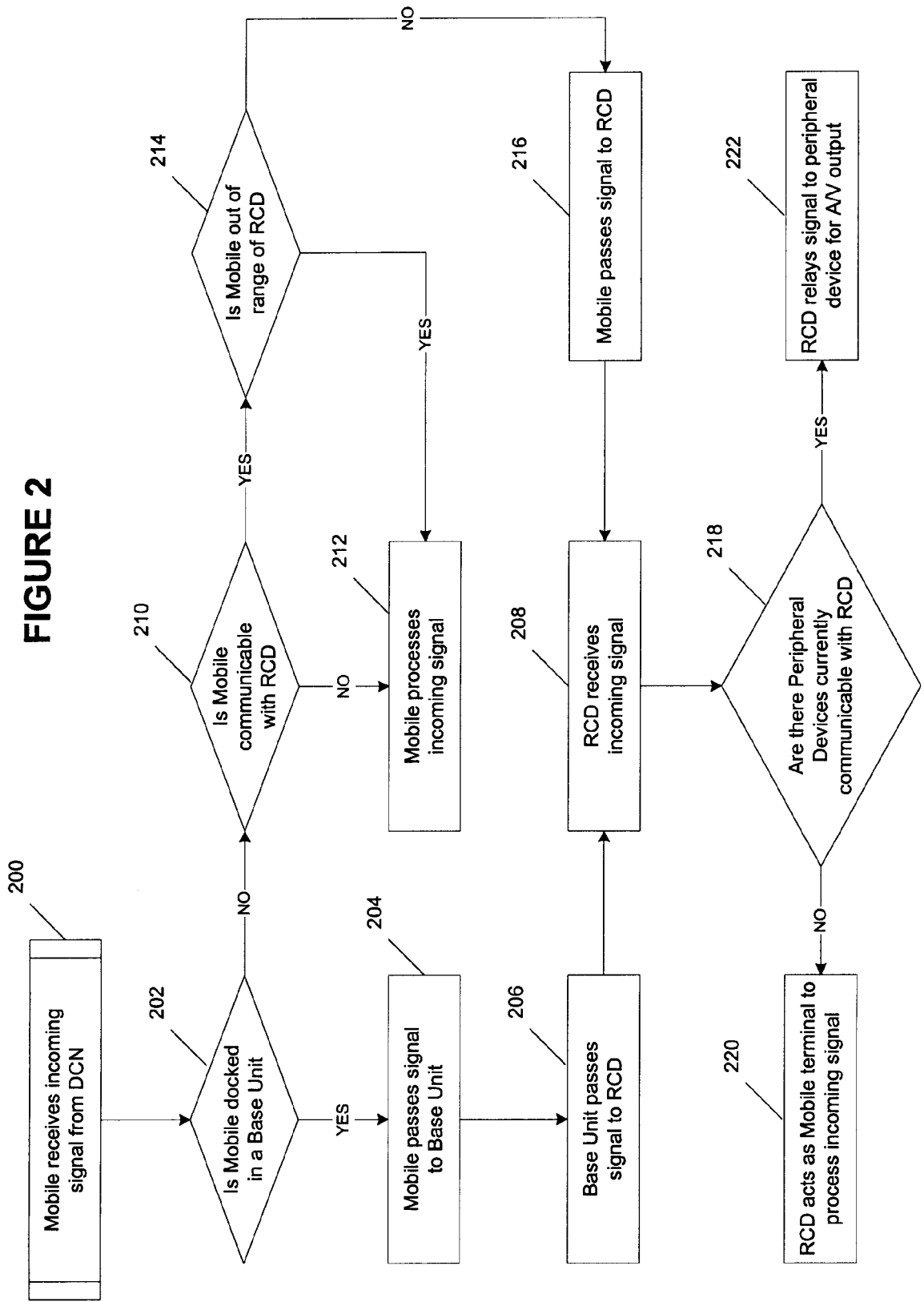
FIG. 2 is a flowchart of the call handling process when a mobile receives a call over the DCN.

FIG. 2 presents a logic diagram of how an incoming signal is processed according to one embodiment of the present invention. An incoming signal can represent a voice signal such as a typical phone call or a data signal such as an SMS, MMS, or e-mail message. The data signal may contain textual, audio, and/or video components. FIG. 2 illustrates two potential scenarios. The first scenario describes using an RCD as the destination device meaning that the incoming signal is passed from the mobile/base unit to the RCD to be processed accordingly. For instance, an incoming phone call can be passed from the mobile phone or base unit to the RCD where the user can answer the call and converse using the RCD. The second scenario uses the RCD as a conduit between the mobile phone/base unit and one or more peripheral devices capable of audio and/or video (A/V) output. That is, in order to transmit a signal from a mobile phone to a peripheral device, the signal must first be sent to the RCD. The RCD then relays or re-transmits the signal to an appropriate peripheral device.

The call handling process, or incoming signal handling process, begins with a mobile phone receiving a digital signal from an external DCN 200. This step entails receiving a wireless digital signal over the DCN using a known wireless protocol. The mobile phone detects the digital signal using a first RF unit communicable with the DCN using standard mobile phone techniques.

After receiving the digital signal, the mobile phone attempts to relay or re-transmit the received signal to the RCD wirelessly over another shorter range wireless protocol that is distinct from the wireless protocol used by the mobile when communicating with the DCN. If the mobile phone is docked in a base unit, then the mobile phone forwards the received digital signal to the base unit. Th base unit then relays or re-transmits the received signal wirelessly to the RCD using the shorter range wireless protocol. Since there are at least two distinct wireless protocols employed, the mobile phone performs any required encoding and decoding of signals to ensure communicability between source and destination devices.

For example, the mobile phone may be receiving voice and data signals from the DCN using a GSM (voice) and GPRS (data) protocol while the wireless protocol utilized between the mobile phone and RCD is based on an unlicensed 2.4 GHz 802.11x protocol. In such a case, the mobile phone will decode an incoming voice or data signal (including control data) from the DCN and encode it for 802.11x before relaying it to the RCD. The process is reversed when the RCD is the source and the DCN is the destination.

With the mobile phone docked in the base unit, the base unit receives the digital signal from the mobile phone 204 and then forwards the digital signal to the RCD 206 using the shorter range wireless protocol. This procedure entails the base unit receiving the digital signal over a serial port from the mobile phone before wirelessly transmitting the digital signal to the RCD where it is received 208.

If the mobile phone is not docked in the base unit 202, and if the mobile phone is not communicable with the RCD 210, then the mobile phone processes the incoming signal from the DCN normally 212. If the mobile phone is communicable with the RCD 210 but out of range of RCD 214, the mobile again processes the incoming signal as it normally would without interaction with the RCD. If, however, the mobile phone is in range of the RCD 214, then the mobile phone relays or re-transmits the received digital signal to the RCD 216 where it is received 208.

The RCD uses a RF unit communicable with the mobile phone and or base unit to receive a digital signal 208 from the base unit or mobile phone. The RCD examines the header (control data) attached to the digital signal in order to determine the type of digital signal received. After determining the signal type (voice or data) the RCD processes the digital signal accordingly.

Once the RCD has received and preliminarily processed an incoming signal from either the mobile phone or base unit, the RCD determines if there are any peripheral devices that are currently communicable with the RCD 218. If not, the RCD acts as an extension of the mobile phone and processes the incoming call 220 keeping A/V output on the RCD. Thus, a user could use the RCD to converse if the incoming signal was a voice call. Or the RCD could display an incoming data message if equipped with a small display screen. If there are currently available peripheral devices communicable with the RCD, then the RCD can re-transmit the incoming signal to be displayed and or heard on an appropriate peripheral device 222.

For instance, caller ID data can be displayed on a television before the user decides to answer a call. Or, upon answering a call, the RCD can route the audio to be played by speakers coupled with a television or stereo system. If the incoming signal is a data signal comprised of text, audio, and/or video, the RCD can seize control of the television in order to "play" the message. If the television happens to be equipped with a digital video recording (DVR) device, the RCD can automatically cause the source signal into the television to be paused so that the user can resume viewing without having missed anything once the RCD/mobile communication is complete.

Figure 3:
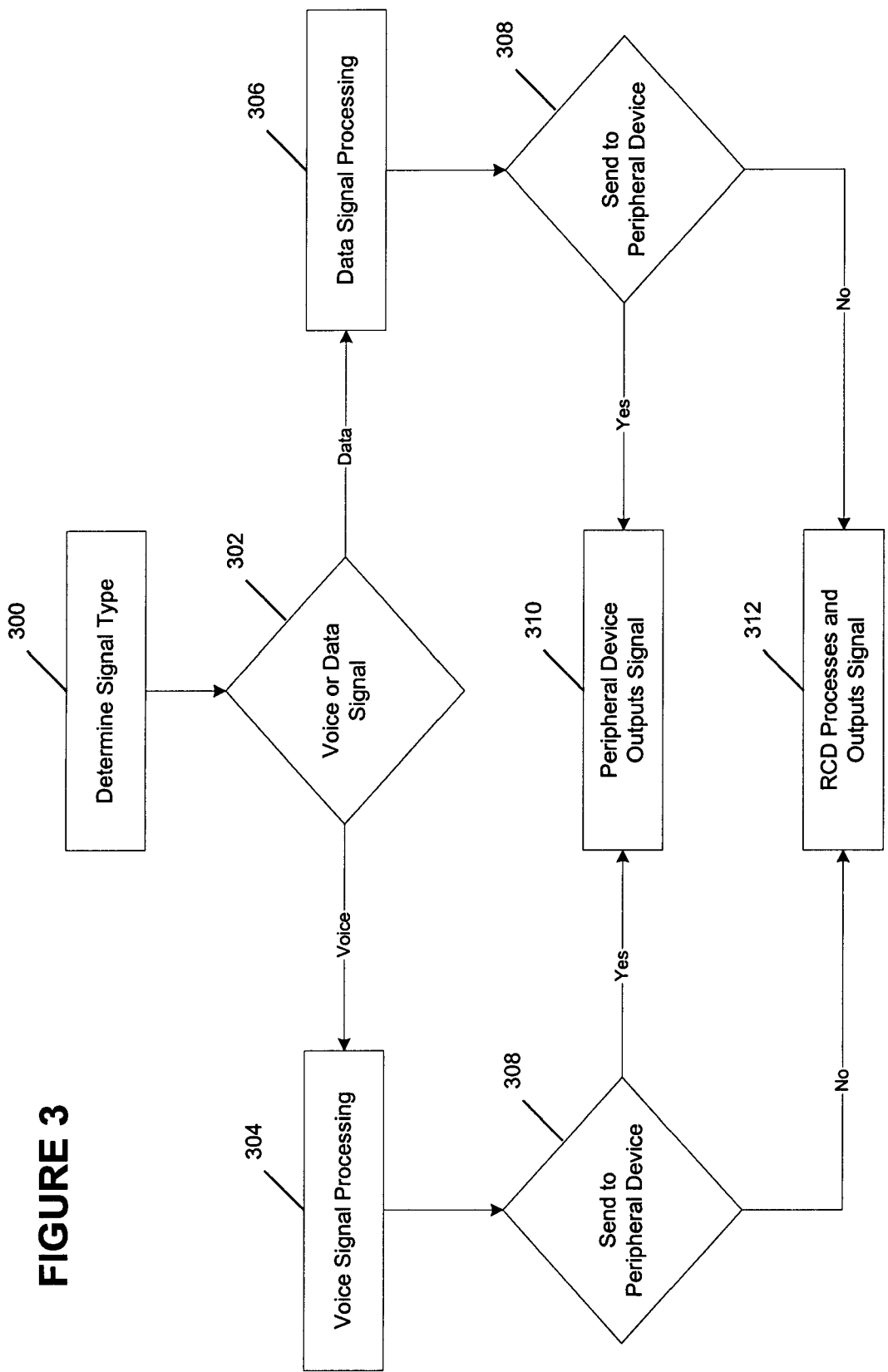
FIG. 3 is a flowchart of events occurring in the RCD during a call handling process.

FIG. 3 provides more detail on how the RCD processes a received signal. The RCD begins by determining whether the received signal is either a voice or a data (text, audio, and/or video) signal 300. Following a determination 302, a voice signal is flagged for voice signal processing 304 and a data signal is flagged for data signal processing 306. For voice signal processing, if the user of the RCD opts to send received audio signals to a peripheral device 308, then the RCD transmits the audio signal to the selected peripheral device 310 to be output. If the user opts not to send received audio signals to a peripheral device 308, then the RCD uses its own speaker(s) to output the received audio signal 312. At any time during a call, the user can opt to send received audio signals to a peripheral device.

Similarly, a data signal (text, audio, and/or video) is forwarded for data signal processing 306. If the user of the RCD opts to send received data signals to a peripheral device 308, then the RCD transmits the data signal to the peripheral device 310. If the user of the RCD opts not to send received data signals to a peripheral device 308, then the RCD outputs the received data signal on its own 312. At any time the user can opt to send received data signals to a peripheral device.

Figure 4:
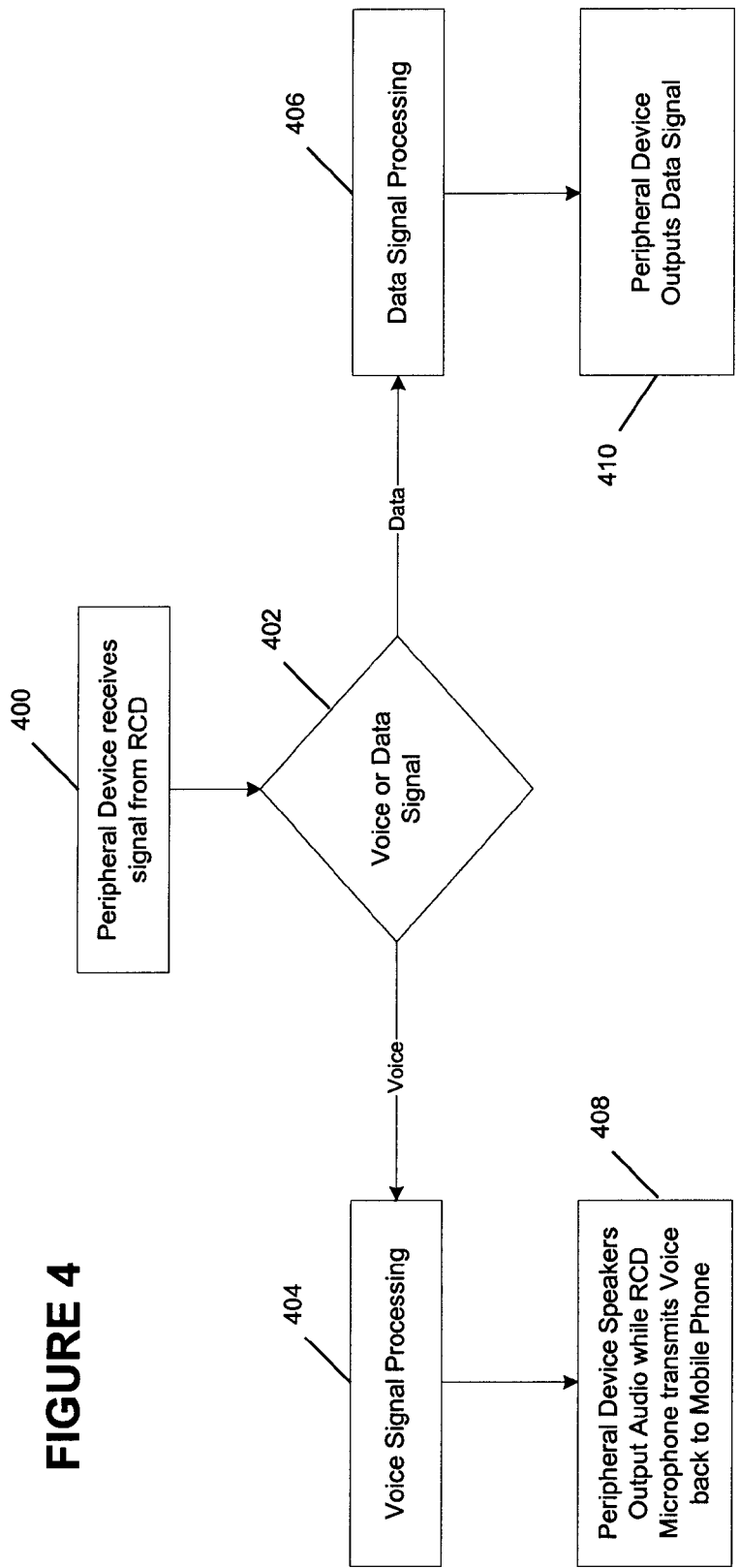
FIG. 4 is a flowchart of events occurring in a peripheral device during a call handling process.

Referring now to FIG. 4, a peripheral device receives a signal from the RCD via a wireless link that can be RF or IR (infrared) based 400. Following a determination of the type of signal 402, voice signals sent to the peripheral device from the RCD are forwarded for voice signal processing 404 and data signals are forwarded for data signal processing 406. For voice signal processing 404, the peripheral device uses integrated speakers to output the audio signals while the RCD uses an integrated microphone to transmit voice signals from the user back to the mobile phone 408. For data signal processing 406, the peripheral device outputs the data in a format appropriate to the data 410.

For instance, an MMS message containing voice and audio can be displayed and audibly output by a peripheral device such as a television. The television would be capable of displaying common video formats including, but not limited to, JPEG or MPEG and audio formats including, but not limited to, wav, midi or mp3. SMS text messages can also be displayed by a television.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim other-wise includes the word "means".

The invention claimed is:

1. A remote control device (RCD) comprising:
    a first wireless interface for controlling and passing content data to one or more peripheral devices;
    a second wireless interface for communicating with a mobile phone;
    a speaker for outputting audio signals received from the mobile phone;
    a microphone for receiving audio signals to be transmitted to the mobile phone; and
    a processor for processing wireless signals communicated between the RCD and the mobile phone, wherein the RCD:
        receives control signals and data from the mobile phone in response to the mobile phone receiving wireless control signals and data from a digital cellular network (DCN), wherein the data received by the RCD from the mobile phone is data selected from the group consisting of a text data signal, an audio data signal, a video data signal, and any combination thereof; and
        transmits the data received from the mobile phone to one of the one or more peripheral devices to be output.

2. The RCD of claim 1 wherein the signals and data received by the RCD from the mobile phone is an audio signal and voice data used for establishing a telephone call.

3. The RCD of claim 2 wherein processing the control signals and data received from the mobile phone comprises using the RCD to connect to a telephone call received by the mobile phone.

4. The RCD of claim 3 wherein the RCD transmits the audio voice data received from the mobile phone to one of the one or more peripheral devices to be audibly output.

5. A remote control device (RCD) communicable with a mobile phone and one or more peripheral devices, the RCD comprising:
    means for controlling the mobile phone to:
        process control signals and data received from the mobile phone, wherein the data received by the RCD from the mobile phone is data selected from the group consisting of a text data signal, an audio data signal, a video data signal, and any combination thereof;
        output data received from the mobile phone;
        handle an incoming telephone call received by the mobile phone from a digital cellular network (DCN); and
    means for controlling and passing content data to the one or more peripheral devices such that data received from the mobile phone can be transmitted to the one or more peripheral devices.

6. The RCD of claim 5 further comprising:
    processing means for processing control signals and data received from the mobile phone;
    a speaker for outputting audio data received from the mobile phone; and
    a microphone for inputting audio data to be sent to the mobile phone.

7. The RCD of claim 6 wherein the remote control device further comprises a user interface to control the output of data received from the mobile phone.

8. The RCD of claim 7 wherein the remote control device further comprises a video display to display video or text data received from the mobile phone.

* * * * *